Patented Apr. 1, 1941

2,236,919

UNITED STATES PATENT OFFICE 2,236,919

PROCESS FOR THE PRODUCTION OF POLY-HYDRIC ALCOHOLS AND DERIVATIVES THEREOF

Arthur Ferdinand August Reynhart, Beverwijk, Netherlands, assignor to Shell Development Company, San Francisco, Calif., a corporation of Delaware No Drawing. Application November 21, 1938, Serial No. 241,638. In the Netherlands December 17, 1937

16 Claims. (Cl. 260—635)

This invention relates to the production of valuable organic compounds, particularly organic compounds of the class consisting of the polyhydric alcohols and their derivatives such as the polyhydric alcohol ethers, esters, mixed ether-esters and the like.

An object of the invention is to provide a practical and economical process adapted to operation on a technical scale for the conversion of epoxy compounds to the more valuable polyhydric alcohols and/or polyhydric alcohol derivatives, and a more particular object of the invention is to provide a commercially attractive process for the hydration of the olefine oxides to the corresponding glycols.

The process of the invention comprises reacting an organic epoxy compound with one or a plurality of hydroxy compounds of the class consisting of water and the organic hydroxy compounds in the liquid phase in the presence of a catalyst comprising or consisting of a heavy metal compound which is partially or completely soluble in colloidal form in the reaction mixture.

It is known that the glycols and glycol ethers, esters and mixed ether-esters can be prepared by the reaction of an olefine oxide with water and/or organic hydroxy compounds such as the alcohols, phenolic compounds and carboxylic acids. The rate at which these reactions proceed at moderately elevated temperatures is too low to warrant any technical consideration. Various attempts have been made to accelerate the rate of reaction of the olefine oxide with the hydroxy compounds and thus make use of the reactions for the industrial scale production of the commercially attractive products resulting therefrom. It has been proposed to bring the reactions within the range of practical utility by operating at elevated temperatures of 130° C. or higher under a superatmospheric pressure sufficient to maintain the reaction mixture in the liquid phase. Such methods have been unsatisfactory because of losses due to the occurrence of undesired side reactions and because of the prohibitively high pressures under which the process must be executed. The pressure increases rapidly with the increase in operating temperature due to the volatility of the olefine oxides and costly and complicated high pressure equipment becomes necessary.

It has also been proposed to bring the known reactions within the field of practical utility by executing them in the presence of catalysts. Several catalysts for this purpose have been suggested. The most active of the catalysts proposed are those of acidic character, particularly sulphuric acid and the other strong mineral acids such as phosphoric, perchloric, nitric, etc.

While the processes depending upon the employment of acid catalysts have the advantage of permitting the use of simpler apparatus than is required for the non-catalytic operation, they are still quite undesirable from a commercial standpoint. Under the prevailing reaction conditions, the acidic reaction mixtures have a strongly corrosive action on the reaction equipment making necessary the use of costly non-corrosive apparatus or requiring periodic replacement of the initially less costly apparatus. Furthermore, the use of acid catalysts in processes for the production of glycols by reacting olefine oxides with water give rise to glycol solutions which are contaminated with difficultly removable impurities which, to avoid destruction of the glycol during subsequent distillation to remove water, should be substantially completely removed as soon as the hydration reaction is terminated. Most processes of this kind make use of sulphuric acid as the catalyst and involve elimination of the acid, after the hydration treatment is terminated, by precipitating it from the aqueous glycol solution in the form of its calcium or barium salts. Such separation is, however, always incomplete and there remains in the solution substantial amounts of non-precipitatable salts of organic sulphuric acid compounds which are only separated during distillation and cause charring which soils the product and impedes the operation and output of the distillation apparatus. Besides the inconveniences mentioned, executing the reactions in the presence of acid catalysts results in material losses and contaminated products due to the excessive occurrence of side reactions which, as well as the desired main reaction, are accelerated by the acids.

Now, I have discovered a process which eliminates the drawbacks and inconveniences of the known process for effecting the reaction of epoxy compounds with water or organic hydroxy compounds. My superior process for the production of polyhydric alcohols and their derivatives is based on the use of a catalyst which accelerates the rate of reaction to at least as great an extent as any of the catalysts previously used, is relatively inexpensive and readily available, and is adapted to be easily and completely removed after completion of the reaction without any destruction of the reaction product. My process results in the attainment of excellent yields of the desired reaction products, the reaction proceeding smoothly and rapidly at considerably lower temperatures and under lower pressures than are necessary when operating without a catalyst or in the presence of the known non-acidic catalysts.

The process of the invention therefore consists essentially in effecting the reaction of an organic epoxy compound with water or with an organic hydroxy compound in the presence of a heavy metal compound which is soluble in colloidal form in the reaction mixture.

Suitable catalysts for use in the process of the invention are the compounds, particularly the organic compounds, of the heavy metals such as iron, nickel, cobalt, manganese, chromium, vanadium, copper, zinc, silver and the like, which compounds are capable of existing in solution in the reaction mixture in colloidal form. Particularly suitable catalysts are the organic compounds of the above-listed and other heavy metals such as the metallo-polyhydric alcohol complexes which are soluble principally as colloids in aqueous mixtures.

A preferred subgroup of catalysts are the compounds of the metals of the iron subgroup, namely, iron, nickel and cobalt. Especially suitable catalysts of this subgroup are the organic compounds of iron, nickel and cobalt, particularly the iron-, nickel-, and cobalt-polyhydric alcohol complexes.

The catalysts of the invention are effective over a wide range of their concentration in the reaction mixture, a suitable but not limitative range of catalyst concentration being from about 0.1% to about 2%. The use of relatively very low concentrations of the catalysts suffices to greatly increase the rate of reaction making it practicable to operate at much lower temperatures than would be required if no catalyst were used. Thus, for example, in the conversion of ethylene oxide to ethylene glycol by reaction with water, the employment, in a concentration of less than 1%, of an organic iron compound prepared by reacting a glycol with metallic iron at an elevated temperature, permitted the reaction to be effected rapidly and completely at temperatures (90° C. to 95° C.) from 35–40° C. lower than would be necessary to obtain a practical rate of reaction in the absence of a catalyst.

The catalyst may be prepared in any suitable manner and introduced as such into the reaction mixture in the desired amount. In some cases, it may be desirable to first dissolve or suspend the catalyst in one or a mixture of the reactants and charge it to the reaction space in the form of such solution or suspension. It is an important feature of my invention that, in many cases, the desired catalyst can be formed in the reaction space during the execution of the process of the invention. For example, this may be done very effectively by providing in the reaction space, instead of the customarily employed inert material packings such as porcelain, bone, clay, etc., packing materials such as Raschig rings, saddle stones, and the like made of iron or some other suitable heavy metal or heavy metal alloy. As a result of the contact of the heavy metal packing material with the reaction mixture containing, for example, a glycol, organic heavy metal compounds are formed in the reaction space under the prevailing reaction conditions. The formed organic heavy metal compounds dissolve in the liquid reaction mixture—as a general rule completely or partially in colloidal form—and catalytically accelerate the reaction.

The heavy metal compounds are left behind in the residues obtained by working up the reaction mixture, after termination of the reaction, to recover the polyhydric alcohol or polyhydric alcohol reaction product or products therefrom. This recovery of the reaction product or products may be effected in any suitable manner. In most cases, it is conveniently done by distillation, preferably under a subatmospheric pressure. The heavy metal compounds contained in the distillation residues may be reutilized as catalysts in the process by returning them, or any suitable portion thereof, to the reaction vessel.

The process of the invention may be executed in any suitable size or shape of reaction vessel. When metal reaction chambers or vessels are employed, the interior surface of the reaction chamber should consist of a material which will lose no substantial amount of iron by contact with the reaction mixture under the reaction conditions. Suitable iron-containing metal surfaces which can be in contact with the reaction mixture during the execution of the process and lose no or practically no iron, during the execution of the process are, for example, the chromium-nickel-steel alloys such as V$_2$A steel which consists of iron and about 18% to 20% chromium, about 0.1% to 0.4% carbon and about 8% to 9.5% nickel and the like. The process may, if desired, be executed in ordinary iron or steel reaction vessels which have been lined with enamel, glass or some like non-corrosive material.

The process of the invention may be executed in a batch, intermittent or continuous manner. The temperature to be employed in any particular case will depend to a certain extent upon the nature and reactivity of the particular reactants, the particular catalyst employed, the desired time of contact of the reactants, etc. It is an advantage of my process that it can in the great majority of cases be satisfactorily executed at temperatures not greater than about 100° C. In general, temperatures in the practical operating range of from 50° C. to 100° C. are suitable.

The process is preferably effected with at least one of the reactants present in the reaction mixture in the liquid phase. In the majority of cases, particularly when one of the reactants is a lower olefine oxide or aliphatic alcohol, it is necessary to insure the presence of said reactant in the system in the liquid phase, to operate under a superatmospheric pressure. In the majority of cases, moderately elevated pressures, that is, pressures not greater than about 10 atmospheres are suitable. A practical operating pressure is from about 2 to about 10 atmospheres, but higher or lower pressures may be used when necessary or desirable.

The process of the invention is applicable broadly to the reaction of an organic epoxy compound with water and/or one or a plurality of organic hydroxy compounds. The general reactions which take place when one mol of an olefine oxide (a representative organic epoxy compound) is reacted, respectively, with one mol of water, an aliphatic alcohol, and a carboxylic acid are illustrated by the following equations:

1. $C_nH_{2n}O + H_2O \rightarrow HO-C_nH_{2n}-OH$

2. $C_nH_{2n}O + ROH \rightarrow RO-C_nH_{2n}-OH$

3. $C_nH_{2n}O + RCOOH \rightarrow RCOO-C_nH_{2n}-OH$

As is illustrated by Equation 1, when an olefine oxide is reacted with water the main product is a glycol. Equation 2 shows that when an olefine oxide is reacted with a representative organic hydroxy compound such as an aliphatic alcohol, cycloaliphatic alcohol, aralkyl alcohol or phenolic compound the resulting product is a glycol ether. As shown by Equation 3, reaction of an olefine oxide with a carboxylic acid (a representative organic hydroxy compound) will result in a carboxylic acid ester of a glycol. It is to be understood that the above equations and explanation thereof are illustrative and are not to be considered as limiting the scope or mechanism of the process.

Suitable organic epoxy compounds are those possessing at least one epoxy oxygen atom linked to two carbon atoms in an aliphatic chain, which carbon atoms may or may not be vicinal, that is, linked directly to each other. A preferred subgroup of organic epoxy compounds embraces those compounds which possess in their structure at least one epoxy group wherein the epoxy oxygen atom is linked to two vicinal carbon atoms. In these compounds the loose bond of the epoxy group

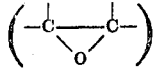

may be taken up by hydrogen atoms or radicals such as alkyl, alkenyl, aralkyl, aryl, carbinol, carbocyclic, heterocyclic, etc., which may or may not be further substituted. Representative epoxy compounds are, among others: the olefine oxides such as ethylene oxide, propylene oxide, normal butylene oxide, isobutylene oxide, the amylene oxides, the hexylene oxides, etc.; the diolefine dioxides such as butadiene dioxide, pentadiene dioxide, hexadiene dioxide, etc.; the glycidols such as glycidol, alpha-methyl glycidol, beta-methyl glycidol, alpha-ethyl glycidol, etc.; the glycidol ethers and esters such as the methyl ether of glycidol, the ethyl ether of glycidol, the propyl ethers of glycidol, glycidol formate, glycidol acetate, the methyl ether of alpha-methyl glycidol, the methyl ether of beta-methyl glycidol, the acetate of alpha-methyl glycidol, etc.; the epihalohydrins such as epichlorhydrin, alpha-methyl epichlorhydrin, beta-methyl epichlorhydrin, etc.; and the like and their homologues, analogues and suitable substitution products.

Representative organic hydroxy compounds which may be reacted with the organic epoxy compounds in accordance with the process of the invention to result in polyhydric alcohol derivatives are: the monohydric alcohols such as methyl alcohol, ethyl alcohol, normal propyl alcohol, isopropyl alcohol, the normal-, iso-, and tertiary butyl alcohols, the amyl alcohols, benzyl alcohol, cyclohexyl alcohol, allyl alcohol, crotyl alcohol, methallyl alcohol, etc.; the polyhydric alcohols such as ethylene glycol, propylene glycol, the butylene glycols, glycerol, alpha-methyl glycerol, beta-methyl glycerol, etc.; the polyhydric alcohol derivatives such as the olefine halohydrins, the glycerol halohydrins, the glycol monoethers, the glycol monoesters, the glycerol mono- and diethers, the glycerol mono- and di-esters, etc.; the phenolic compounds such as phenol, the cresols, the xylols, pyrogallol, hydroquinone, resorcinol, etc.; the carboxylic acids such as formic acid, acetic acid, propionic acid, butyric acid, isobutyric acid, benzoic acid, etc.; the hydroxy aldehydes, ketones and acids, etc.; and the like and their homologues, analogues and suitable substitution products.

The process of my invention is particularly adapted to the technical scale hydration of the olefine oxides to the corresponding glycols, and it will, for purposes of illustration and with no intent to limit the invention, be hereinafter described in detail as applied to the technical scale hydration of ethylene oxide to ethylene glycol in a continuous manner.

*Example*

The process was executed in a steel autoclave provided with a lining of V₂A steel and packed with iron Raschig rings. The ethylene oxide was continuously fed under pressure into the bottom of the autoclave, while a dilute aqueous ethylene glycol solution, consisting of freshly fed water and bottom liquid discharged from the autoclave, was continuously introduced into the top of the autoclave.

During the operation, the temperature of the reaction mixture in the autoclave was maintained at about 95° C. to 100° C. This temperature was easily maintained by utilization of the heat liberated by the exothermic hydration reaction. The pressure in the reaction system during the operation was about 2 atmospheres. Due to the catalytic effect of the iron compounds formed by contact of the iron Raschig rings with the glycol-containing reaction mixture, the introduced ethylene oxide was converted rapidly and almost quantitatively to ethylene glycol with the formation of only a very small quantity of higher boiling by-products. The iron compounds which catalyzed the reaction were in solution in colloidal form in the reaction mixture; in them the iron appears to occur chiefly in the ferro form, probably bound in a complex manner to glycol.

A portion of the reaction mixture, which contained about 10% ethylene glycol, was discharged continuously from the autoclave and released into a still kept at a temperature of about 120° C. From this still, a liquid glycol-water mixture containing about 65% to 70% ethylene glycol was continuously discharged, while the distillate, which contained about 6% to 7% ethylene glycol, was condensed by lowering its temperature to about 65° C. to 70° C. and introduced continuously into the reaction vessel.

The 65% to 70% ethylene glycol-water solution discharged from the still was conducted to a rectification still operated under a reduced pressure. Anhydrous ethylene glycol was obtained in a yield of about 90%, calculated on the ethylene oxide introduced into the system.

For purposes of comparison, the iron Raschig rings used in the reactor in which the above-described operation was conducted were replaced by porcelain rings of similar size and shape and an attempt was made to effect the hydration of ethylene oxide to ethylene glycol in the same manner and under the same condition in the absence of any heavy metal catalyst, added or formed in situ. It was found that without application of heat to the reactor, the temperature therein did not rise any higher than about 60° C. When the temperature of the reaction mixture was kept at about 95° C. to 100° C. by external heating, the introduced ethylene oxide was only partially reacted. The unreacted ethylene oxide dissolved in the reaction mixture and was present in solution in the reaction mixture continuously discharged from the reactor. The dissolved ethylene oxide was freed when the withdrawn reaction mixture was expanded into the still. A large part of the freed ethylene oxide was lost, while a considerable portion of it reacted with the glycol in the still resulting in the formation of diethylene glycol and other undesired high boiling products, contaminating the final product and materially decreasing the yield of ethylene glycol.

While I have described my invention in a detailed manner and illustrated suitable modes of executing the same, it is to be understood that modifications may be made and that no limitations other than those imposed by the scope of the appended claims are intended.

I claim as my invention:

1. A process for the production of ethylene glycol which comprises reacting ethylene oxide with water at a temperature of from about 50° C. to about 100° C. and under a pressure sufficiently high to insure the presence of a liquid phase in the reaction system in the presence of an organic iron compound formed in situ by the action of at least one of the organic components of the reaction system on iron contact elements provided therein.

2. A process for the production of ethylene glycol which comprises reacting ethylene oxide with water in the presence of an organic iron compound at a temperature of from about 50° C. to about 100° C. and under a pressure sufficiently high to insure a liquid phase in the reaction system.

3. A process for the production of ethylene glycol which comprises reacting ethylene oxide with water at a temperature from about 50° C. to about 100° C., and in the presence of a ferroglycol organic complex compound.

4. A process for the production of ethylene glycol which comprises reacting ethylene oxide with water at a temperature from about 50° C. to about 100° C., and in the presence of an organic heavy metal compound which is at least partially soluble in colloidal form in the liquid reaction mixture.

5. A process for the production of a glycol which comprises reacting an olefine oxide with water at a temperature from about 50° C. to about 100° C., and in the liquid phase in a reaction vessel packed with iron rings which are acted upon by at least one of the organic components of the reaction mixture under reaction conditions to result in the acceleration of the hydration reaction by forming an organic iron compound which is at least partially soluble in colloidal form in the reaction mixture.

6. A process for the production of a glycol which comprises reacting an olefine oxide with water at a temperature from about 50° C. to about 100° C., and in the presence of a ferroglycol complex organic compound.

7. A process for the production of a glycol which comprises reacting an olefine oxide with water at a temperature from about 50° C. to about 100° C., and in the presence of an organic compound of a metal of the iron subgroup which is at least partially soluble in colloidal form in the liquid reaction mixture.

8. A process for the production of a glycol which comprises reacting an olefine oxide with water at a temperature from about 50° C. to about 100° C., and in the presence of an organic heavy metal compound which is at least partially soluble in colloidal form in the liquid reaction mixture.

9. A process for the production of a polyhydric alcohol which comprises reacting an organic epoxy compound with water at a temperature from about 50° C. to about 100° C., and in the liquid phase in a reaction vessel packed with pieces of an organic heavy metal which reacts to a limited extent with at least one of the components of the reaction mixture to catalyze the hydration reaction by providing an organic heavy metal compound which is at least partially soluble in colloidal form in the reaction mixture.

10. A process for the production of a polyhydric alcohol which comprises reacting an organic epoxy compound with water at a temperature from about 50° C. to about 100° C., and in the liquid phase in a reaction vessel the interior surface of which is substantially incapable of corrosion by the components of the reaction mixture under the reaction conditions, and catalyzing the hydration reaction by effecting it in the presence of an organic heavy metal compound which is at least partially soluble in colloidal form in the reaction mixture under reaction conditions.

11. A process for the production of a polyhydric alcohol derivative which comprises reacting an organic epoxy compound with an organic hydroxy compound in the presence of an organic heavy metal compound which is at least partially soluble in colloidal form in the liquid reaction mixture.

12. A process for the production of polyhydric alcohols and derivatives thereof which comprises reacting an organic epoxy compound with at least one hydroxy compound of the group consisting of water and the organic hydroxy compounds at a temperature up to 100° C., the reaction being effected in a reaction vessel provided with a packing consisting of a heavy metal which reacts to a limited extent with at least one of the organic components of the reaction mixture during the reaction to catalyze the reaction by supplying an organic heavy metal compound which is at least partially soluble in colloidal form in the reaction mixture.

13. A process for the production of polyhydric alcohols and derivatives thereof which comprises reacting an organic epoxy compound with at least one hydroxy compound of the group consisting of water and the organic hydroxy compounds at a temperature up to 100° C. in the presence of an organic heavy metal compound which is at least partially soluble in colloidal form in the liquid reaction mixture and is formed in situ in the reaction mixture due to the action of at least one of the organic components of the reaction mixture on a heavy metal in contact therewith under the reaction conditions.

14. A process for the production of polyhydric alcohols and derivatives thereof which comprises reacting an organic epoxy compound with at least one hydroxy compound of the group consisting of water and the organic hydroxy compounds at a temperature up to 100° C. in the presence of an organic iron compound which is at least partially soluble in colloidal form in the liquid reaction mixture.

15. A process for the production of polyhydric alcohols and derivatives thereof which comprises reacting an organic epoxy compound with at least one hydroxy compound of the group consisting of water and the organic hydroxy compounds at a temperature up to 100° C. in the presence of a compound of a metal of the organic iron subgroup which is at least partially soluble in colloidal form in the liquid reaction mixture.

16. A process for the production of polyhydric alcohols and derivatives thereof which comprises reacting an organic epoxy compound with at least one hydroxy compound of the group consisting of water and the organic hydroxy compounds at a temperature up to 100° C. in the presence of an organic heavy metal compound which is at least partially soluble in colloidal form in the liquid reaction mixture.

ARTHUR FERDINAND
AUGUST REYNHART.